United States Patent
Kurosawa et al.

(10) Patent No.: US 9,676,309 B2
(45) Date of Patent: Jun. 13, 2017

(54) VEHICLE HEATING APPARATUS AND HEATER-EQUIPPED VEHICLE SEAT

(71) Applicant: Panasonic Intellectual Property Management Co., Ltd., Osaka-shi, Osaka (JP)

(72) Inventors: Yoshiaki Kurosawa, Osaka (JP); Takehiko Ise, Osaka (JP); Atsunori Hashimoto, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 154 days.

(21) Appl. No.: 14/418,821

(22) PCT Filed: May 22, 2014

(86) PCT No.: PCT/JP2014/002705
§ 371 (c)(1),
(2) Date: Jan. 30, 2015

(87) PCT Pub. No.: WO2014/196141
PCT Pub. Date: Dec. 11, 2014

(65) Prior Publication Data
US 2015/0210193 A1    Jul. 30, 2015

(30) Foreign Application Priority Data
Jun. 3, 2013    (JP) .................................. 2013-116899

(51) Int. Cl.
*B60N 2/56*    (2006.01)
*B60H 1/00*    (2006.01)

(52) U.S. Cl.
CPC ....... *B60N 2/5657* (2013.01); *B60H 1/00285* (2013.01); *B60N 2/5628* (2013.01);
(Continued)

(58) Field of Classification Search
CPC .. B60N 2/5657; B60N 2/5628; B60N 2/5635; B60N 2/5671; B60H 1/00285
See application file for complete search history.

(56) References Cited

U.S. PATENT DOCUMENTS 5,450,894 A * 9/1995 Inoue ................. B60H 1/00285
165/43
6,321,996 B1 * 11/2001 Odebrecht ......... B60H 1/00285
237/12.3 A
(Continued)

FOREIGN PATENT DOCUMENTS

| CN | 102001299 | 4/2011 |
|---|---|---|
| CN | 102951052 | 3/2013 |

(Continued)

OTHER PUBLICATIONS

Extended European Search Report issued in corresponding European Patent Application No. 14807919.7, Oct. 15, 2015, 7 pages.
(Continued)

*Primary Examiner* — David R Dunn
*Assistant Examiner* — Tania Abraham
(74) *Attorney, Agent, or Firm* — Hamre, Schumann, Mueller & Larson, P.C.

(57) ABSTRACT

A vehicle heating apparatus (10a) to be mounted on or built in a vehicle seat (2) at a location below a sitting portion S of the vehicle seat (2) includes a housing (20), a fan (14), and a heater (15). The housing (20) has an intake port (11), a left nozzle (12*l*), a right nozzle (12*r*), an air curtain nozzle (12*c*), and an internal space (13) serving as air flow paths from the intake port (11) to the left nozzle (12*l*), to the right nozzle (12*r*), and to the air curtain nozzle (12*c*). The air curtain nozzle (12*c*) is located between the left nozzle (12*l*) and the right nozzle (12*r*), and is formed so as to, in the usage state, blow air delivered by the fan (14) in a direction inclined
(Continued)

upward at an angle of not more than 90° to a direction in which warm wind is blown out of the left nozzle (12*l*) and the right nozzle (12*r*).

9 Claims, 12 Drawing Sheets

(52) U.S. Cl.
CPC ......... *B60N 2/5635* (2013.01); *B60N 2/5671* (2013.01); *B60N 2/5685* (2013.01)

(56) References Cited

U.S. PATENT DOCUMENTS

| | | | | |
|---|---|---|---|---|
| 6,746,076 | B2* | 6/2004 | Bogisch | B60J 7/223 297/180.14 |
| 2002/0057006 | A1* | 5/2002 | Bargheer | B60H 1/00285 297/180.14 |
| 2006/0137358 | A1* | 6/2006 | Feher | B60N 2/5635 62/3.3 |
| 2009/0051197 | A1* | 2/2009 | Bargheer | B60H 1/00478 297/180.13 |
| 2011/0187165 | A1* | 8/2011 | Oota | B60N 2/5657 297/180.14 |
| 2012/0153701 | A1* | 6/2012 | Lin | B60N 2/5628 297/452.46 |
| 2013/0043320 | A1 | 2/2013 | Zhang et al. | |
| 2015/0084384 | A1 | 3/2015 | Ise et al. | |

FOREIGN PATENT DOCUMENTS

| | | |
|---|---|---|
| CN | 104169127 | 11/2014 |
| DE | 10 2009 052683 | 5/2011 |
| JP | 2011-254882 | 12/2011 |
| JP | 2012-183154 | 9/2012 |

OTHER PUBLICATIONS

Search Report for Chinese Application No. 201480002000.3, dated Dec. 1, 2016, 3 pages including English translation.

* cited by examiner

VEHICLE HEATING APPARATUS AND HEATER-EQUIPPED VEHICLE SEAT

TECHNICAL FIELD

The present invention relates to a vehicle heating apparatus to be mounted on or built in a vehicle seat. The present invention also relates to a heater-equipped vehicle seat including the vehicle heating apparatus.

BACKGROUND ART

As seats for vehicles such as wheeled vehicles, heater-equipped vehicle seats capable of supplying warm wind to the lower legs of occupants have been conventionally proposed.

Patent Literature 1 discloses a heater-equipped vehicle seat 200 in which an air conditioner 210 is disposed within a seat cushion 202a as shown in FIG. 11A. The air conditioner 210 has an intake port 211, an intake duct 213a, an air blower 214, a pair of discharge ducts 213b, a pair of heaters 215, and a pair of discharge ports 212. The heater 215 is disposed within each of the pair of discharge ducts 213b. The intake port 211 and the pair of discharge ports 212 open in a forward direction with respect to the heater-equipped vehicle seat 200, and are arranged side by side in a horizontal direction. In addition, the discharge port 212 is provided with a fin 212a for causing air discharged from the discharge port 212 to be directed downward.

Patent Literature 2 discloses a heater-equipped vehicle seat 300 including, as shown in FIG. 11B, a seat cushion 302a, a leg rest member 312, an air blower 314, and a duct 313. A portion of the duct 313 is formed in the leg rest member 312. Warm wind delivered from the air blower 314 is supplied toward the lower legs of an occupant through the duct 313.

CITATION LIST

Patent Literature

Patent Literature 1: JP 2011-254882 A
Patent Literature 2: JP 2012-183154 A

SUMMARY OF INVENTION

Technical Problem

For the heater-equipped vehicle seats described in Patent Literature 1 and Patent Literature 2, there is room for increasing warmth for the occupant and thereby improving comfort to the occupant. The present invention therefore aims to provide a vehicle heating apparatus capable of giving high warmth to the occupant.

Solution to Problem

The present disclosure provides a vehicle heating apparatus to be mounted on or built in a vehicle seat at a location below a sitting portion of the vehicle seat, the vehicle heating apparatus including:

a housing having an intake port, a left nozzle, a right nozzle, an air curtain nozzle, and an internal space serving as air flow paths from the intake port to an opening of the left nozzle, to an opening of the right nozzle, and to an opening of the air curtain nozzle;

a fan provided in the internal space; and a heater provided in the internal space, wherein the left nozzle and the right nozzle are formed so as to, in a usage state where the vehicle heating apparatus is mounted on the vehicle seat, blow warm wind produced by the heater and the fan downward with respect to a horizontal direction at locations spaced apart from each other in a width direction of the vehicle seat, and the air curtain nozzle is located between the left nozzle and the right nozzle, and is formed so as to, in the usage state, blow air delivered by the fan in a direction inclined upward at an angle of not more than 90° to a direction in which the warm wind is blown out of the left nozzle and the right nozzle.

Advantageous Effects of Invention

With the above vehicle heating apparatus, flow of air blown out of the air curtain nozzle restrains the upward movement of warm wind blown out of the left nozzle and the right nozzle; therefore, high warmth can be given to the occupant.

DESCRIPTION OF EMBODIMENTS

Figure 1:
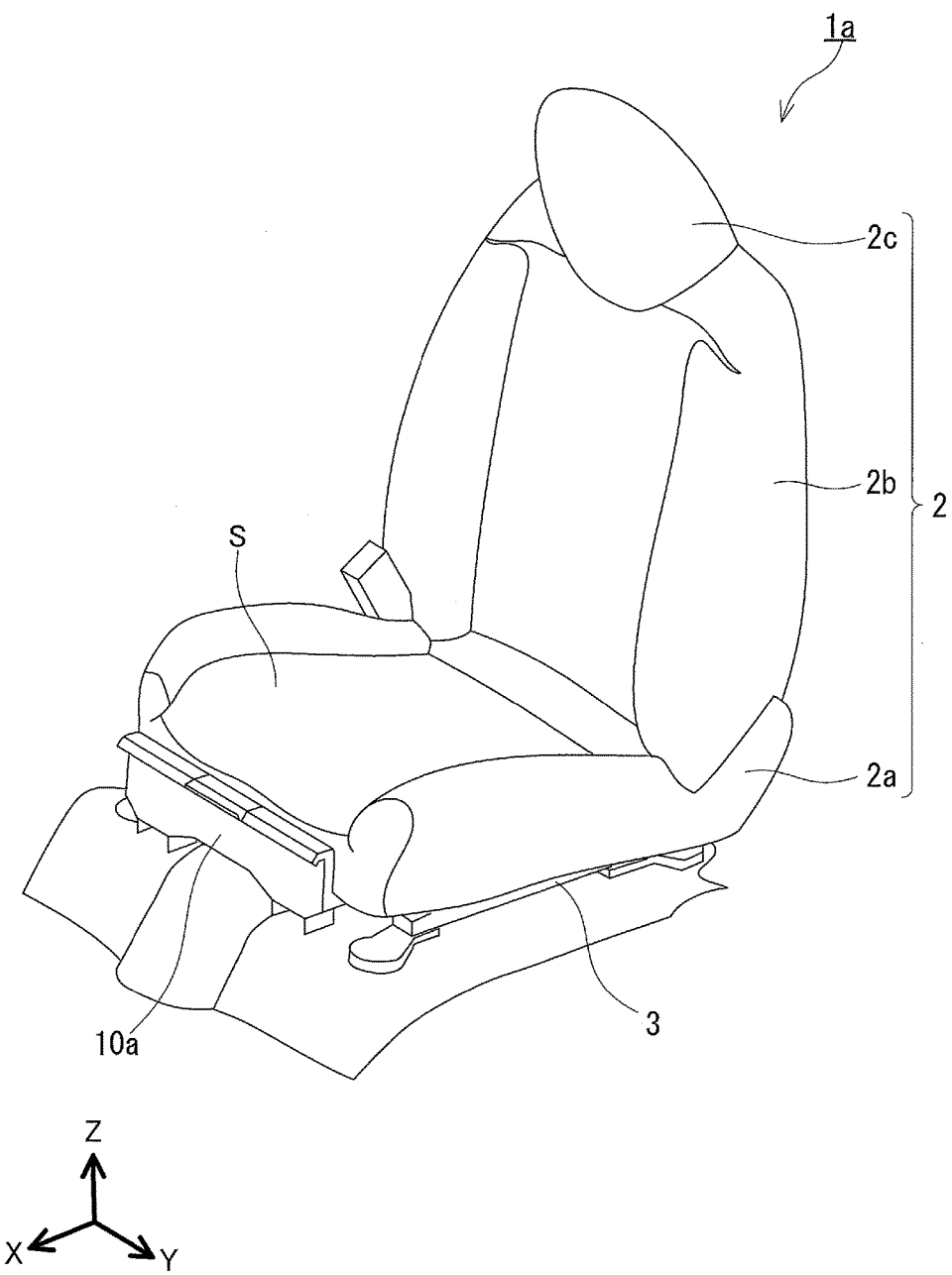
FIG. 1 is a perspective view of a heater-equipped vehicle seat according to a first embodiment of the present disclosure.

With the heater-equipped vehicle seat 200 of Patent Literature 1, warm wind supplied forward of the seat cushion 202a from the discharge ports 212 flows along the lower legs of the occupant. However, warm air that has deviated from the lower legs of the occupant may move upward due to buoyancy. In this case, the occupant cannot feel sufficient warmth around his/her toes.

With the heater-equipped vehicle seat 300 of Patent Literature 2, warm wind is blown out of the exit of the duct 313 toward the lower legs of the occupant. As in the case of the heater-equipped vehicle seat 200 of Patent Literature 1, the warm wind that has deviated from the lower legs of the occupant may move upward due to buoyancy so that sufficient warmth cannot be provided around the toes.

A first aspect of the present disclosure provides a vehicle heating apparatus to be mounted on or built in a vehicle seat at a location below a sitting portion of the vehicle seat, the vehicle heating apparatus including:

a housing having an intake port, a left nozzle, a right nozzle, an air curtain nozzle, and an internal space serving as air flow paths from the intake port to an opening of the left nozzle, to an opening of the right nozzle, and to an opening of the air curtain nozzle;

a fan provided in the internal space; and a heater provided in the internal space, wherein the left nozzle and the right nozzle are formed so as to, in a usage state where the vehicle heating apparatus is mounted on the vehicle seat, blow warm wind produced by the heater and the fan downward with respect to a horizontal direction at locations spaced apart from each other in a width direction of the vehicle seat, and the air curtain nozzle is located between the left nozzle and the right nozzle, and is formed so as to, in the usage state, blow air delivered by the fan in a direction inclined upward at an angle of not more than 90° to a direction in which the warm wind is blown out of the left nozzle and the right nozzle.

According to the first aspect, flow of air blown out of the air curtain nozzle restrains the upward movement of warm wind having been blown out of the left nozzle and the right nozzle and having deviated from the lower legs of the occupant. In addition, since warm air is carried by flow of air blown out of the air curtain nozzle, warm wind is likely to reach the vicinity of the toes of the occupant. Accordingly, the warmth for the occupant can be increased over wide regions of the lower legs of the occupant.

A second aspect of the present disclosure provides the vehicle heating apparatus as set forth in the first aspect, wherein the air curtain nozzle is formed so as to blow air in a substantially horizontal direction or downward with respect to the horizontal direction in the usage state. According to the second aspect, warm wind blown out of the left nozzle and the right nozzle is more likely to reach the vicinity of the toes of the occupant.

A third aspect of the present disclosure provides the vehicle heating apparatus as set forth in the first aspect or the second aspect, wherein an area of the opening of the air curtain nozzle is smaller than an area of the opening of the left nozzle and smaller than an area of the opening of the right nozzle. According to the third aspect, the velocity of flow of air blown out of the air curtain nozzle is increased; thus, warm wind blown out of the left nozzle and the right nozzle is more likely to reach the vicinity of the toes of the occupant.

A fourth aspect of the present disclosure provides the vehicle heating apparatus as set forth in any one of the first aspect to the third aspect, wherein the air flow path from the intake port to the air curtain nozzle bypasses the heater. According to the fourth aspect, air blown out of the air curtain nozzle is not heated by the heater; thus, the air blown out of the air curtain nozzle is less likely to move upward. Therefore, the air blown out of the air curtain nozzle is more likely to form a flow traveling straight.

A fifth aspect of the present disclosure provides the vehicle heating apparatus as set forth in any one of the first aspect to the fourth aspect, wherein the intake port includes: a left intake port for drawing air to be fed to the left nozzle; a right intake port for drawing air to be fed to the right nozzle; and an air curtain intake port for drawing air to be fed to the air curtain nozzle, and the air curtain intake port is formed so as to be located above the left intake port and the right intake port in the usage state. According to the fifth aspect, air that has deviated from the flow of warm wind blown out of the left nozzle or the right nozzle and moving along the lower leg of the occupant can be drawn into the internal space of the housing through the air curtain intake port. Therefore, the temperature of air drawn through the air curtain intake port is higher than the temperature of air in the vicinity of the toe of the occupant. Accordingly, air having a temperature suitable for blowing from the air curtain nozzle can be drawn through the air curtain intake port.

A sixth aspect of the present disclosure provides the vehicle heating apparatus as set forth in any one of the first aspect to the fourth aspect, wherein the fan is a single fan provided in the internal space, the intake port is formed as a unified intake port for drawing air to be fed to the left nozzle, to the right nozzle, and to the air curtain nozzle, and the vehicle heating apparatus further includes a flow-dividing member that is provided downstream of the fan in a direction of air flow in the internal space and that adjusts the amount of air flowing toward each of the left nozzle, the right nozzle, and the air curtain nozzle. According to the sixth aspect, the number of fans provided in the internal space is minimum; therefore, the production cost of the vehicle heating apparatus can be reduced. By virtue of the function of the flow-dividing member, an appropriate amount of air can be made to flow toward the left nozzle, the right nozzle, and the air curtain nozzle.

A seventh aspect of the present disclosure provides the vehicle heating apparatus as set forth in any one of the first aspect to the sixth aspect, wherein the air curtain nozzle is formed in such a manner that the internal space in the air curtain nozzle becomes wider in the width direction of the vehicle seat with decreasing distance to the opening of the air curtain nozzle. According to the seventh aspect, flow of air blown out of the air curtain nozzle spreads in the width direction of the vehicle seat; thus, the upward movement of warm wind blown out of the left nozzle and the right nozzle can be restrained over a wide region.

An eighth aspect of the present disclosure provides the vehicle heating apparatus as set forth in any one of the first aspect to the seventh aspect, the vehicle heating apparatus further including an opening-closing mechanism that opens and closes the opening of the air curtain nozzle. It is conceivable that blowing air out of the air curtain nozzle may reduce the comfort to the occupant depending on the conditions such as the outside air temperature, the sitting posture of the occupant, and the clothes of the occupant. In this case, according to the eighth aspect, it is possible to prohibit air from being blown out of the air curtain nozzle.

A ninth aspect of the present disclosure provides a heater-equipped vehicle seat including:

a vehicle seat; and the vehicle heating apparatus as set forth in any one of the first aspect to the eighth aspect, the vehicle heating apparatus being mounted on or built in the vehicle seat at a location below a sitting portion of the vehicle seat.

Hereinafter, embodiments of the present disclosure will be described with reference to the drawings. The following description relates to examples of the present invention, and the present invention is not limited by these examples. The following description assumes that the vehicle is placed on a horizontal plane.

First Embodiment

As shown in FIG. 1, a heater-equipped vehicle seat 1a includes: a vehicle seat 2 having a seat cushion 2a, a back cushion 2b, and a head rest 2c; and a vehicle heating apparatus 10a. The heater-equipped vehicle seat 1a is attached to a base member 3 provided on the floor of the vehicle. In the seat cushion 2a is formed a sitting portion S that supports the upper legs of the occupant. The back cushion 2b supports the back of the occupant. The vehicle heating apparatus 10a is mounted on the vehicle seat 2 at a location below the sitting portion S. That is, the heater-equipped vehicle seat 1a includes the vehicle seat 2 and the vehicle heating apparatus 10a mounted on the vehicle seat 2 at a location below the sitting portion S of the vehicle seat 2. The vehicle heating apparatus 10a is provided at an end of the vehicle seat 2 in the forward direction (the positive direction of the X axis), and mainly supplies warm wind to the lower legs of the occupant. In the accompanying drawings, the XY plane is horizontal. The forward direction with respect to the heater-equipped vehicle seat 1a is defined as the positive direction of the X axis. The width direction of the heater-equipped vehicle seat 1a is defined as the Y direction, and the direction from the right leg of the occupant toward the left leg of the occupant is defined as the positive direction of the Y axis. The Z axis is perpendicular to the XY plane, and the Z-axis direction is the vertical direction. In the present description, "left" and "right" are determined with respect to the occupant seated on the heater-equipped vehicle seat 1a.

Figure 2:
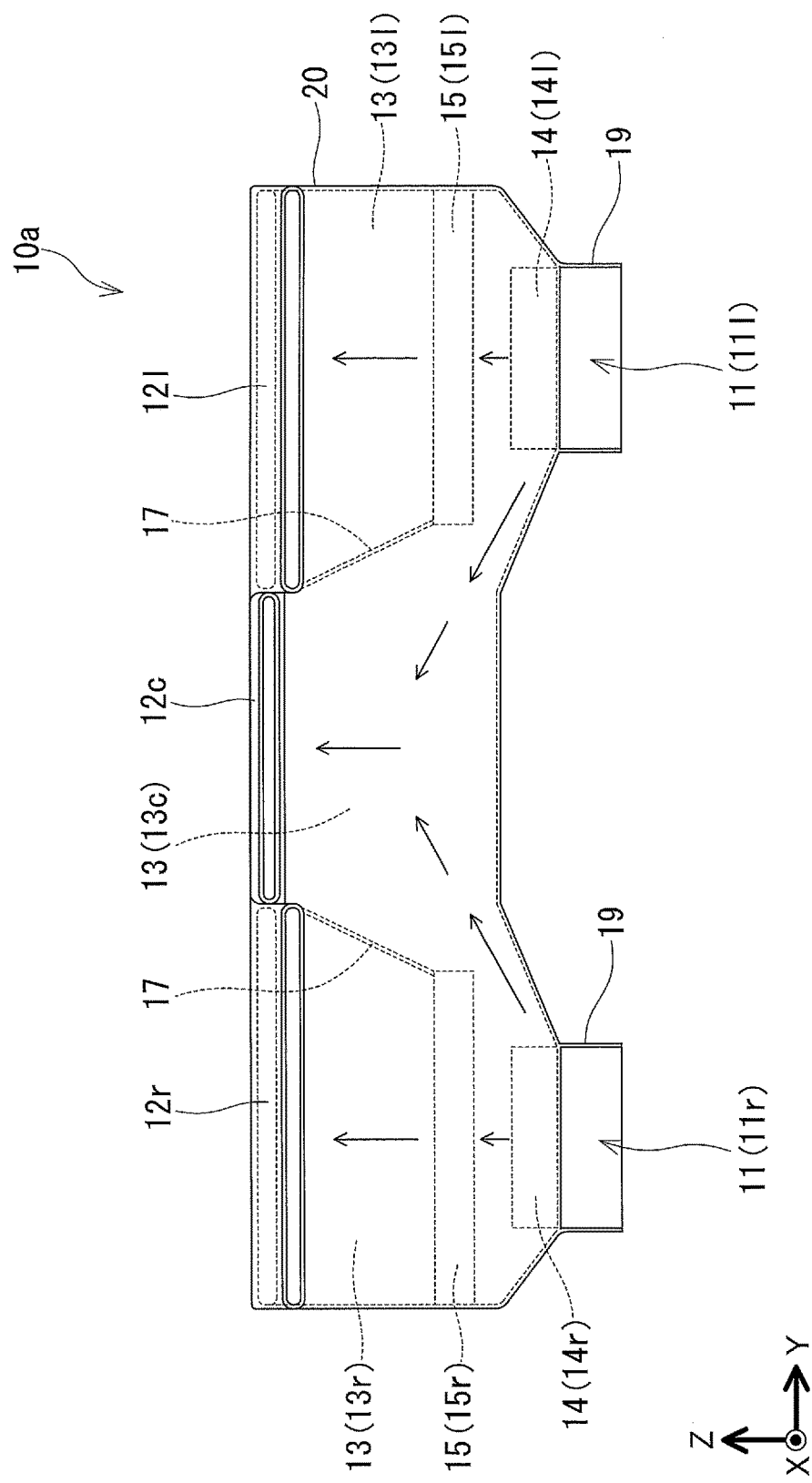
FIG. 2 is a front view of a vehicle heating apparatus according to the first embodiment.

As described above, the vehicle heating apparatus 10a is a heating apparatus to be mounted on the vehicle seat 2 at a location below the sitting portion S of the vehicle seat 2. As shown in FIG. 2, the vehicle heating apparatus 10a includes a housing 20, a fan 14, and a heater 15. The housing 20 has an intake port 11, a left nozzle 12l, a right nozzle 12r, an air curtain nozzle 12c, and an internal space 13. The internal space 13 is formed to serve as air flow paths from the intake port 11 to the opening of the left nozzle 12l, to the opening of the right nozzle 12r, and to the opening of the air curtain nozzle 12c. The fan 14 and the heater 15 are provided in the internal space 13 of the housing 20.

Figure 3:
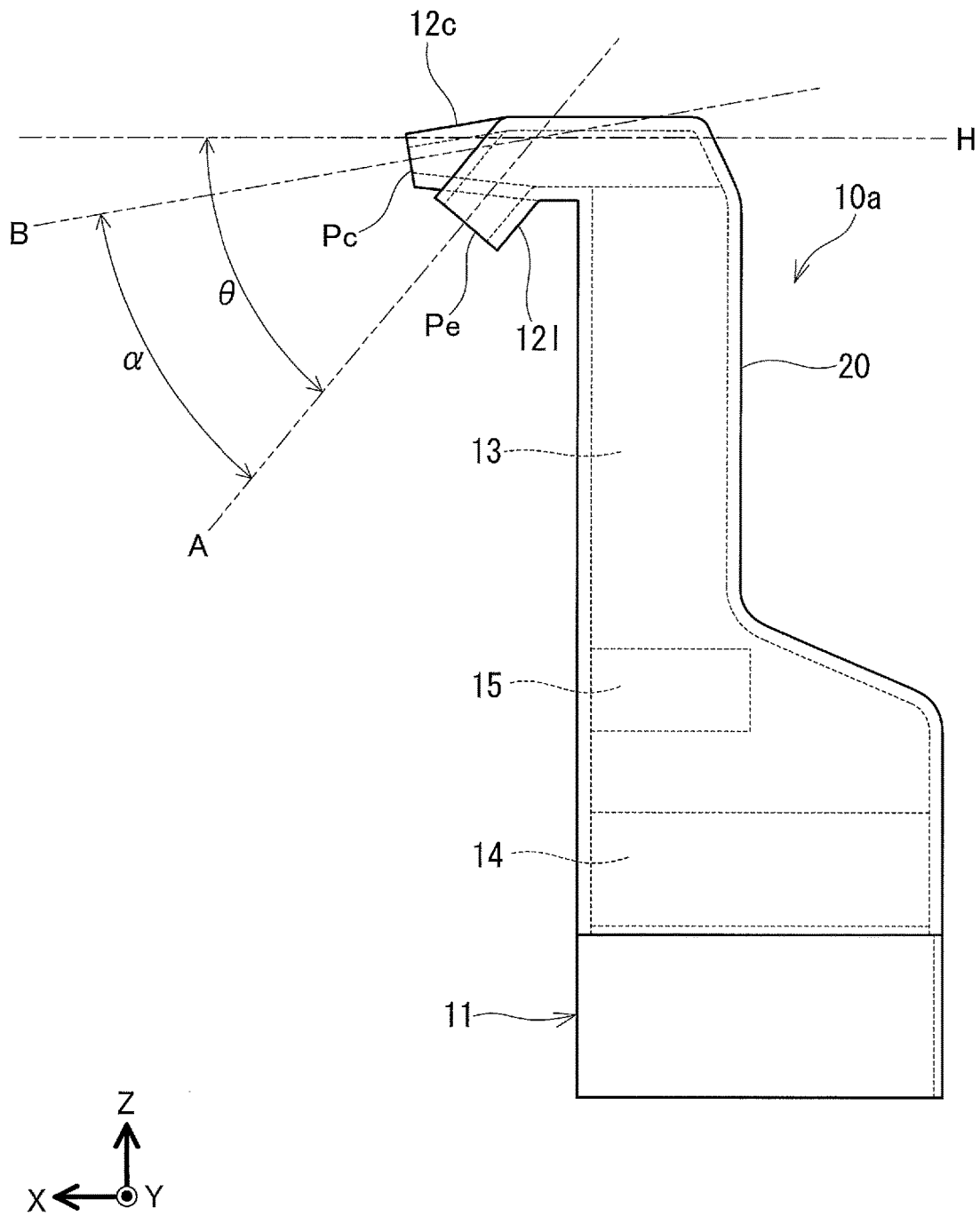
FIG. 3 is a side view of the vehicle heating apparatus shown in FIG. 2.

As shown in FIG. 3, the left nozzle 12l and the right nozzle 12r are formed so as to, in a state (referred to as a "usage state" hereinafter) where the vehicle heating apparatus 10a is mounted on the vehicle seat 2, blow warm wind produced by the fan 14 and the heater 15 downward with respect to the horizontal direction at locations spaced from each other in the width direction of the vehicle seat 2. That is, the left nozzle 12l is formed in the left end portion of the housing 20, and the right nozzle 12r is formed in the right end portion of the housing 20. The left nozzle 12l is formed in such a manner that an angle θ formed between a normal line A to the opening face of the opening Pe of the left nozzle 12l and a horizontal plane H is an acute angle (0°<θ<90°). The right nozzle 12r is formed in the same manner. In addition, the left nozzle 12l and the right nozzle 12r are located above the intake port 11 in the usage state.

The air curtain nozzle 12c is located between the left nozzle 12l and the right nozzle 12r. The air curtain nozzle 12c is formed so as to, in the usage state, blow air delivered by the fan 14 in a direction inclined upward at an angle of not more than 90° to the direction in which warm wind is blown out of the left nozzle 12l and the right nozzle 12r. That is, the air curtain nozzle 12c is formed in such a manner that an angle α formed between a normal line B to the opening face of the opening Pc of the air curtain nozzle 12c and the normal line A is an acute angle or 90° (0°<α≤90°). Also, the air curtain nozzle 12c is located above the intake port 11.

In the usage state, the intake port 11 opens forward or downward. The intake port 11 includes a left intake port 11l and a right intake port 11r. In the usage state, the left intake port 11l is located directly below the left nozzle 12l. The right intake port 11r is located directly below the right nozzle 12r. In addition, the housing 20 includes a confining wall 19 that restrains air from being drawn through the intake port 11 from the back or side in the usage state.

As shown in FIG. 2, the air flow path 13 is divided by a partition plate 17 into three sections, that is, a left flow path 13l, a right flow path 13r, and an air curtain flow path 13c. The left flow path 13l is a flow path of air to be blown out of the left nozzle 12l. The right flow path 13r is a flow path of air to be blown out of the right nozzle 12r. The air curtain flow path 13c is a flow path of air to be blown out of the air curtain nozzle 12c.

The fan 14 includes a left fan 14l and a right fan 14r. By actuation of the left fan 14l, air is drawn into the housing 10 through the left intake port 11l. By actuation of the right fan 14r, air is drawn into the housing 20 through the right intake port 11r. The heater 15 includes a left heater 15l and a right heater 15r. The left heater 15l extends directly above the left intake port 11l and the left fan 14l in the width direction of the housing 20 (Y direction). The right heater 15r extends directly above the right intake port 11r and the right fan 14r in the width direction of the housing 20. Specifically, the left heater 15l is provided in the section (left flow path 13l) of the air flow path 13 between the left fan 14l and the left nozzle 12l. The right heater 15r is provided in the section (right flow path 13r) of the air flow path 13 between the right fan 14r and the right nozzle 12r. Air delivered by the left fan 14l flows toward the left flow path 13l or the air curtain flow path 13c. Air delivered by the right fan 14r flows toward the right flow path 13r or the air curtain flow path 13c.

Air flowing in the left flow path 13l toward the left nozzle 12l is heated by passing through the left heater 15l. Thus, warm wind is blown out of the left nozzle 12l. In addition, air flowing in the right flow path 13r toward the right nozzle 12r is heated by passing through the right heater 15r. Thus, warm wind is blown out of the right nozzle 12r. Air flowing in the air curtain flow path 13c toward the air curtain nozzle 12c is blown out of the air curtain nozzle 12c without passing through the heater 15. That is, the section of the air flow path 13 from the intake port 11 to the air curtain nozzle 12c bypasses the heater 15. Therefore, the temperature of air blown out of the air curtain nozzle 12c is lower than the temperatures of warm wind blown out of the left nozzle 12l and the right nozzle 12r.

Figure 4:
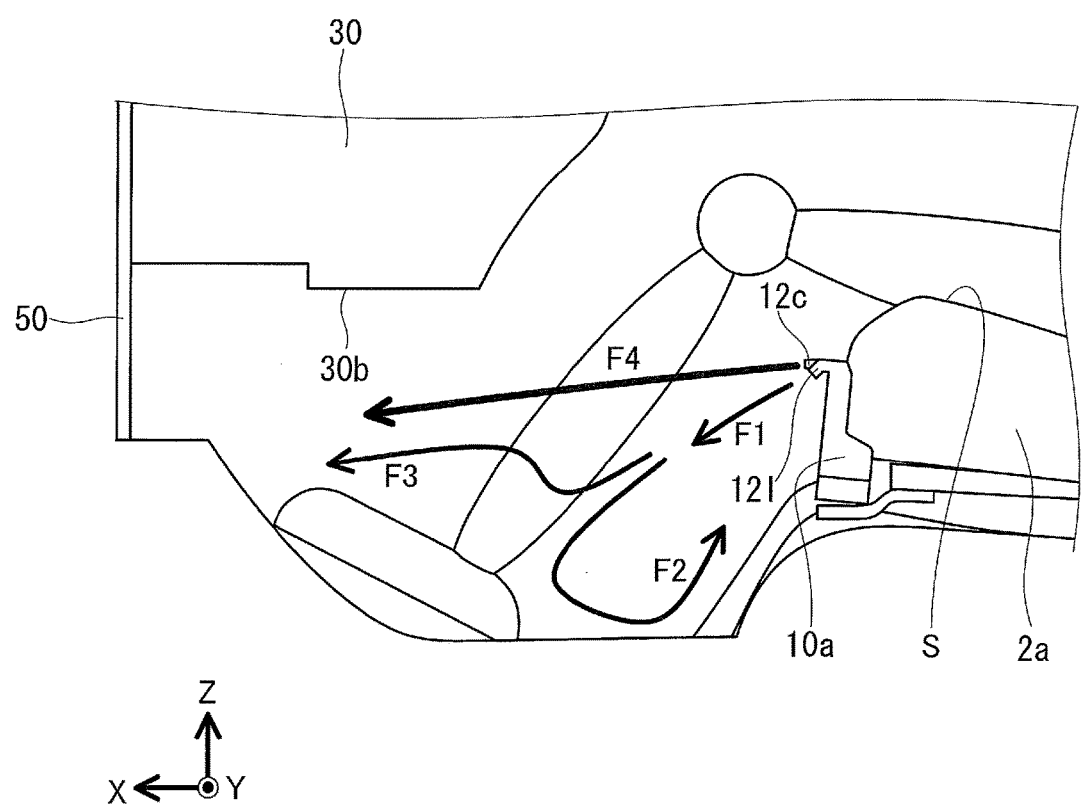
FIG. 4 is a side view conceptually showing air flows produced by the vehicle heating apparatus shown in FIG. 2.

As shown in FIG. 4, warm wind blown out of the left nozzle 12l or the right nozzle 12r flows downward along the lower leg of the occupant and reaches the floor of the vehicle. The warm wind having reached the floor of the vehicle is pushed by the subsequent warm wind blown out of the left nozzle 12l or the right nozzle 12r, flows upward and backward, and reaches the vicinity of the intake port 11 (F1, F2). In this manner, the warm wind blown out of the left nozzle 12l or the right nozzle 12r forms circulating air flows F1 and F2 below the sitting portion S of the vehicle seat 2. Therefore, it is possible to increase the temperature of air drawn through the intake port 11 and to reduce the amount of heating required of the heater 15. The air curtain nozzle 12c is located between the left nozzle 12l and the right nozzle 12r; therefore, flow of air blown out of the air curtain nozzle 12c travels straight in such a manner as to pass between the two legs of the occupant. Accordingly, an air curtain flow F4 is formed. As described above, the temperature of air blown out of the air curtain nozzle 12c is lower than the temperatures of warm wind blown out of the left nozzle 12*l* and the right nozzle 12*r*. Therefore, air blown out of the air curtain nozzle 12*c* is not likely to move upward due to buoyancy but likely to travel straight.

Some of warm wind blown out of the left nozzle 12*l* or the right nozzle 12*r* tends to deviate from the lower leg of the occupant and move upward between the two legs of the occupant due to buoyancy. However, the upward movement of warm wind is restrained by the air curtain flow F4. In addition, the warm wind having deviated from the lower leg of the occupant flows as if the warm wind is dragged by the air curtain flow F4, and reaches the vicinity of the toe of the occupant (F3). Thus, the warmth in the vicinity of the toe of the occupant is increased. Due to the presence of a lower face 30*b* of an instrument panel 30 and a dash panel 50 of the vehicle (wheeled vehicle), warm air having reached the vicinity of the toe of the occupant is less likely to flow forward or upward. Therefore, warm air is likely to be retained in the vicinity of the toes of the occupant. Consequently, the warmth for the occupant can be increased over wide regions of the lower legs of the occupant. For example, the temperature in the vicinity of the toes of the occupant can be increased by 2 to 3° C., as compared with the case where no air is blown out of the air curtain nozzle 12*c*.

In the present embodiment, the fan 14 is located closer to the intake port 11 than the heater 15 is. That is, according to the present embodiment, the heater 15 is not situated upstream of the fan 14 in the air flow path 13. With such a configuration, the pressure loss of the flow upstream of the fan 14 in the air flow path 13 is reduced, and therefore reduction in suction force of the fan 14 can be limited. In addition, since the heater 15 is located downstream of the fan 14 in the air flow path 13, the length of the air flow path 13 between the left heater 15*l* and the left nozzle 12*l* or between the right heater 15*r* and the right nozzle 12*r* is relatively short. Therefore, heat loss of air heated by the heater 15 is reduced. The fan 14 may be provided adjacent to the intake port 11 as shown in FIG. 2.

An axial-flow fan or a centrifugal fan can be used as the fan 14. The amount of air delivered by the fan 14 is not particularly limited. For example, it is recommended that air have a flow velocity of 0.4 to 2.0 m/sec immediately after being driven by the fan 14. The amount of air delivered by the fan 14 is, for example, 1.8 to 15 m³/hour. If so, circulating flows of warm wind like the circulating air flows F1 and F2 are more likely to be formed. The heater 15 is, for example, an electric heater such as a PTC (Positive Temperature Coefficient) heater or a ceramic heater. In this case, the heater 15 generates heat by receiving electricity supplied from a power supply (omitted from the drawings), and heats the air flowing toward the left nozzle 12*l* or the right nozzle 12*r*. The output power of the heater 15 is not particularly limited, and is, for example, 50 to 300 W. The heater 15 may be a hot-water heater or the like that performs heating using a coolant having exchanged heat with a heat source (e.g., a water-cooled engine) external to the vehicle heating apparatus 10*a*.

The angle θ formed between the normal line A and the horizontal plane H is not particularly limited, as long as it is more than 0° and less than 90°. The angle θ is, for example, 30° to 70°. In this case, warm wind blown out of the left nozzle 12*l* and the right nozzle 12*r* is more likely to flow along the lower legs of the occupant, and warm wind is more likely to reach the intake port 11. Therefore, both high probability of warm wind reaching the intake port 11 and ensuring of warmth for the lower legs of the occupant are more reliably achieved. In order to enhance this effect, the angle θ is desirably in the range of 35° to 60°, and more desirably in the range of 40° to 50°.

The angle α formed between the normal line B and the normal line A is not particularly limited, as long as it is more than 0° and not more than 90°. The angle α is desirably defined in such a manner that the air curtain flow F4 is formed below the lower face 30*b* of the instrument panel 30 of the vehicle (wheeled vehicle). If so, the upward movement of warm wind can be effectively restrained by the air curtain flow F4. In addition, the angle α is desirably defined in such a manner that the air curtain flow F4 is formed to move toward the region above the locations at which the feet of the occupant are placed. In this case, the warmth in the vicinity of the toes of the occupant can be effectively increased. It is recommended that the air curtain nozzle 12*c* be formed so as to blow air, for example, in a substantially horizontal direction or downward with respect to the horizontal direction in the usage state. In this case, depending on the type of the vehicle (wheeled vehicle), the air curtain flow F4 is more likely to be formed below the lower face 30*b* of the instrument panel 30. As used herein, the term "substantially horizontal direction" includes a direction inclined upward at an angle of 5° or less to the horizontal direction and the horizontal plane.

The relationship between the area of the opening of the air curtain nozzle 12*c* and the area of the opening of the left nozzle 12*l*, and the relationship between the area of the opening of the air curtain nozzle 12*c* and the area of the opening of the right nozzle 12*r*, are not particularly limited. From the viewpoint of increasing the flow velocity of air blown out of the air curtain nozzle 12*c*, the area of the opening of the air curtain nozzle 12*c* is desirably smaller than the area of the opening of the left nozzle 12*l* and smaller than the area of the opening of the right nozzle 12*r*.

The width of the left nozzle 12*l* and the width of the right nozzle 12*r* are greater than the width of the left intake port 11*l* and the width of the right intake port 11*r*, respectively. The ratio of the width W2 of the left nozzle 12*l* to the width W1 of the left intake port 11*l* (W2/W1) is, for example, in the range of 1.2 to 10. This applies to the right intake port 11*r* and the right nozzle 12*r*. In the width direction (Y-axis direction), the left intake port 11*l* is entirely located within the width of the left nozzle 12*l*, and the right intake port 11*r* is entirely located within the width of the right nozzle 12*r*. With such a configuration, the effects as described below can also be obtained. The left nozzle 12*l* and the right nozzle 12*r* are required to have a certain width since it is necessary to warm the lower legs of the occupant. By contrast, the area of the opening of the intake port 11 is desirably small in order to increase the flow velocity of air in the vicinity of the intake port 11 in the air flow path 13 and thus to efficiently draw air into the housing 20 through the intake port 11. If the ratio (W2/W1) is in the above-specified range, it is possible to ensure both increase in warmth for the lower legs of the occupant and efficient suction of air through the intake port 11.

Figure 5:
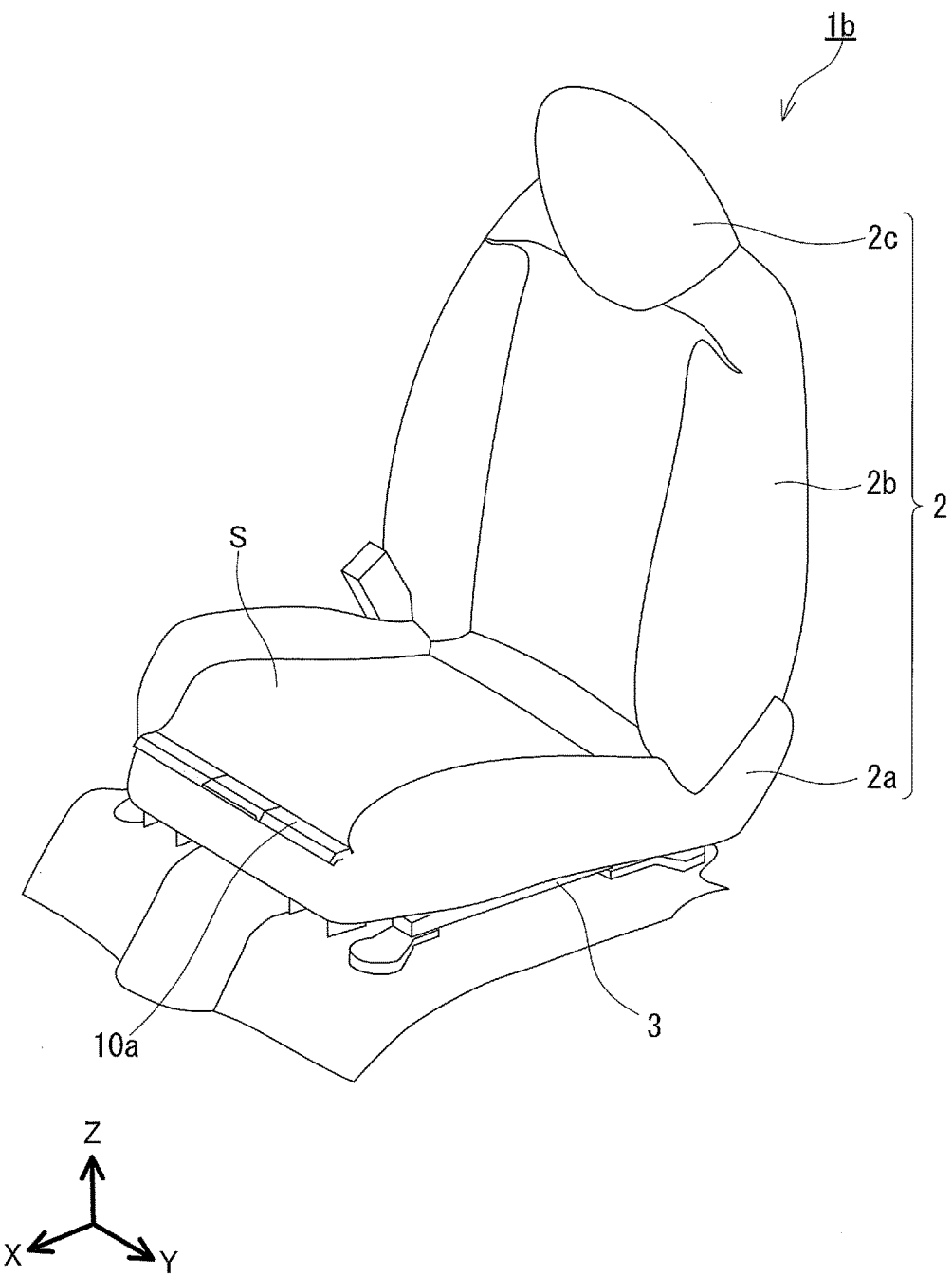
FIG. 5 is a perspective view of a heater-equipped vehicle seat according to a modification of the first embodiment.

The above embodiment can be modified in various respects. For example, as shown in FIG. 5, the vehicle heating apparatus 10*a* may be a heating apparatus to be built in the vehicle seat 2 at a location below the sitting portion S of the vehicle seat 2. A heater-equipped vehicle seat 2*b* according to this modification includes the vehicle heating apparatus 10*a* built in the vehicle seat 2 at a location below the sitting portion S of the vehicle seat 2. Specifically, other portions of the housing 20 of the vehicle heating apparatus 10*a* than the intake port 11, the left nozzle 12*l*, the right nozzle 12*r*, and the air curtain nozzle 12*c*, are enclosed by the vehicle seat 2. Since the housing 20 is mostly enclosed by the vehicle seat in this manner, heat release to the outside of the housing 20 from the internal space 13 is reduced.

Second Embodiment

Next, a vehicle heating apparatus 10b according to a second embodiment of the present disclosure will be described. Unless otherwise described, the second embodiment is configured in the same manner as the first embodiment. The components of the second embodiment that are the same as or correspond to those of the first embodiment are denoted by the same reference characters as used in the first embodiment, and the detailed description of such components may be omitted. That is, the descriptions given for the first embodiment can apply to the present embodiment unless being technically inconsistent. This is also true for the embodiments described later.

Figure 6:
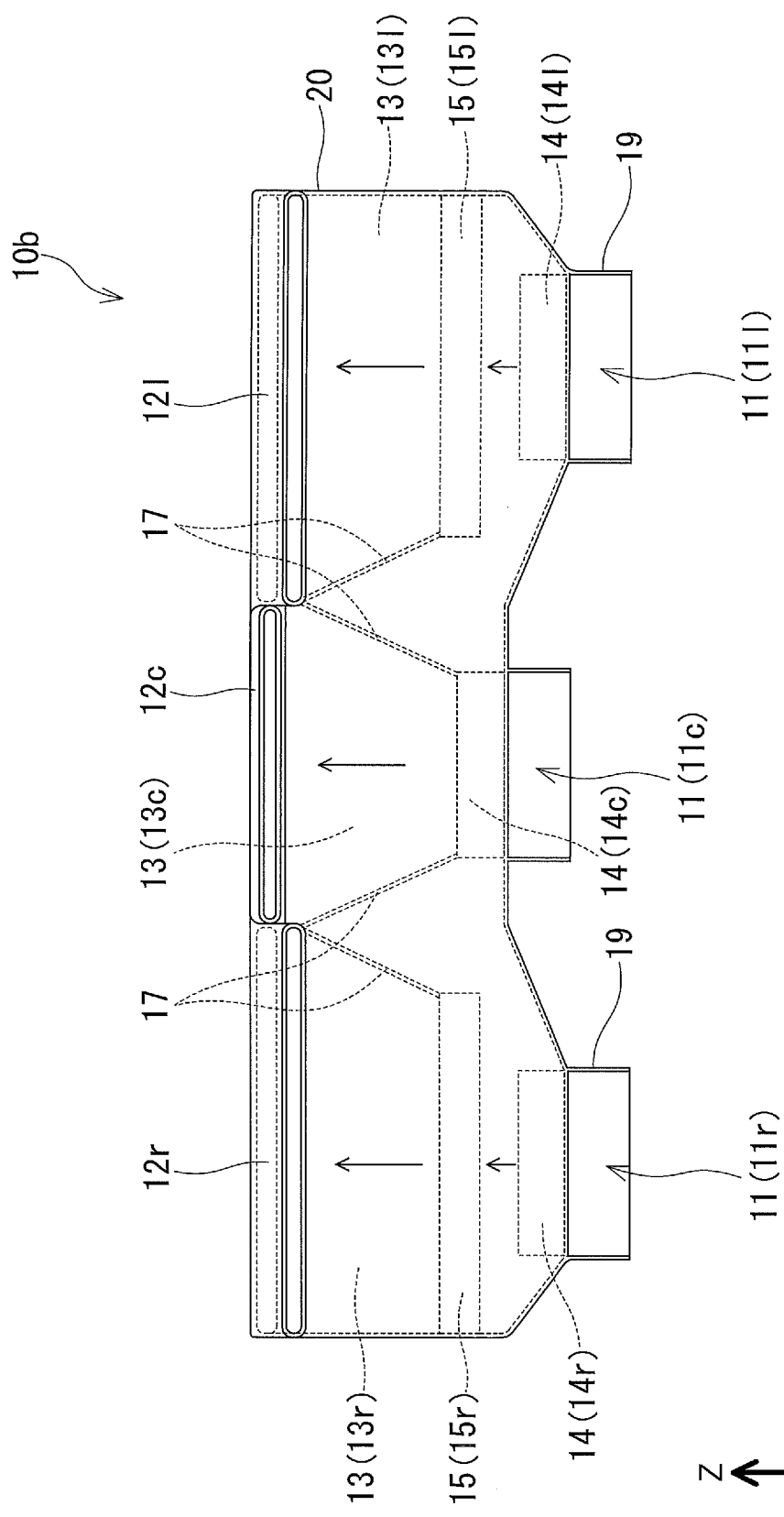
FIG. 6 is a front view of a vehicle heating apparatus according to a second embodiment of the present disclosure.

As shown in FIG. 6, the intake port 11 of the vehicle heating apparatus 10b includes the left intake port 11l for drawing air to be fed to the left nozzle 12l, the right intake port 11r for drawing air to be fed to the right nozzle, and an air curtain intake port 11c for drawing air to be fed to the air curtain nozzle 12c. The air curtain intake port 11c is formed so as to be located above the left intake port 11l and the right intake port 11r in the usage state.

The fan 14 includes the left fan 14l, the right fan 14r, and a central fan 14c. By actuation of the left fan 14l, air is drawn into the housing 20 through the left intake port 11l. By actuation of the right fan 14r, air is drawn into the housing 20 through the right intake port 11r. By actuation of the central fan 14c, air is drawn into the housing 20 through the air curtain intake port 11c. Air delivered by the left fan 14l is heated by the left heater 15l. Air delivered by the right fan 14r is heated by the right heater 15r. Thus, warm wind is blown out of the left nozzle 12l and the right nozzle 12r. The warm wind blown out of the left nozzle 12l and the right nozzle 12r flows along the lower legs of the occupant, and reaches the left intake port 11l or the right intake port 11r. Air delivered by the central fan 14c is blown out of the air curtain nozzle 12c without being heated by the heater 15.

Some of the warm wind blown out of the left nozzle 12l and the right nozzle 12r deviates from the lower legs of the occupant, and loses its downward velocity. Therefore, warm air moves upward between the two legs of the occupant due to buoyancy. As described above, the air curtain intake port 11c is formed at a location above the left intake port 11l and the right intake port 11r. Therefore, some of the warm air that has been blown out of the left nozzle 12l or the right nozzle 12r and has deviated and moved upward from the lower leg of the occupant is drawn through the air curtain intake port 11c. Consequently, the temperature of air drawn into the housing 20 through the air curtain intake port 11c is higher than the temperature of air in the vicinity of the toes. In addition, the air drawn into the housing 20 through the air curtain intake port 11c is not heated by the heater 15. Therefore, air having an appropriate temperature can be blown out of the air curtain nozzle 12c. Consequently, it is possible to increase the warmth for the occupant while restraining air blown out of the air curtain nozzle 12c from moving upward due to buoyancy.

In the present embodiment, the housing 20 may be divided into three parts, that is, a left housing, a right housing, and a central housing. In this case, the left housing has the left intake port 11l, the left nozzle 12l, and an internal space serving as the air flow path from the left intake port 11l to the left nozzle 12l. The left fan 14l and the left heater 15l are provided in the internal space of the left housing. The right housing has the right intake port 11r, the right nozzle 12r, and an internal space serving as the air flow path from the right intake port 11r to the right nozzle 12r. The right fan 14r and the right heater 15r are provided in the internal space of the right housing. The central housing has the air curtain intake port 11c, the air curtain nozzle 12c, and an internal space serving as the air flow path from the air curtain intake port 11c to the air curtain nozzle 12c. The central fan 14c is provided in the internal space of the central housing.

Third Embodiment

Figure 7:
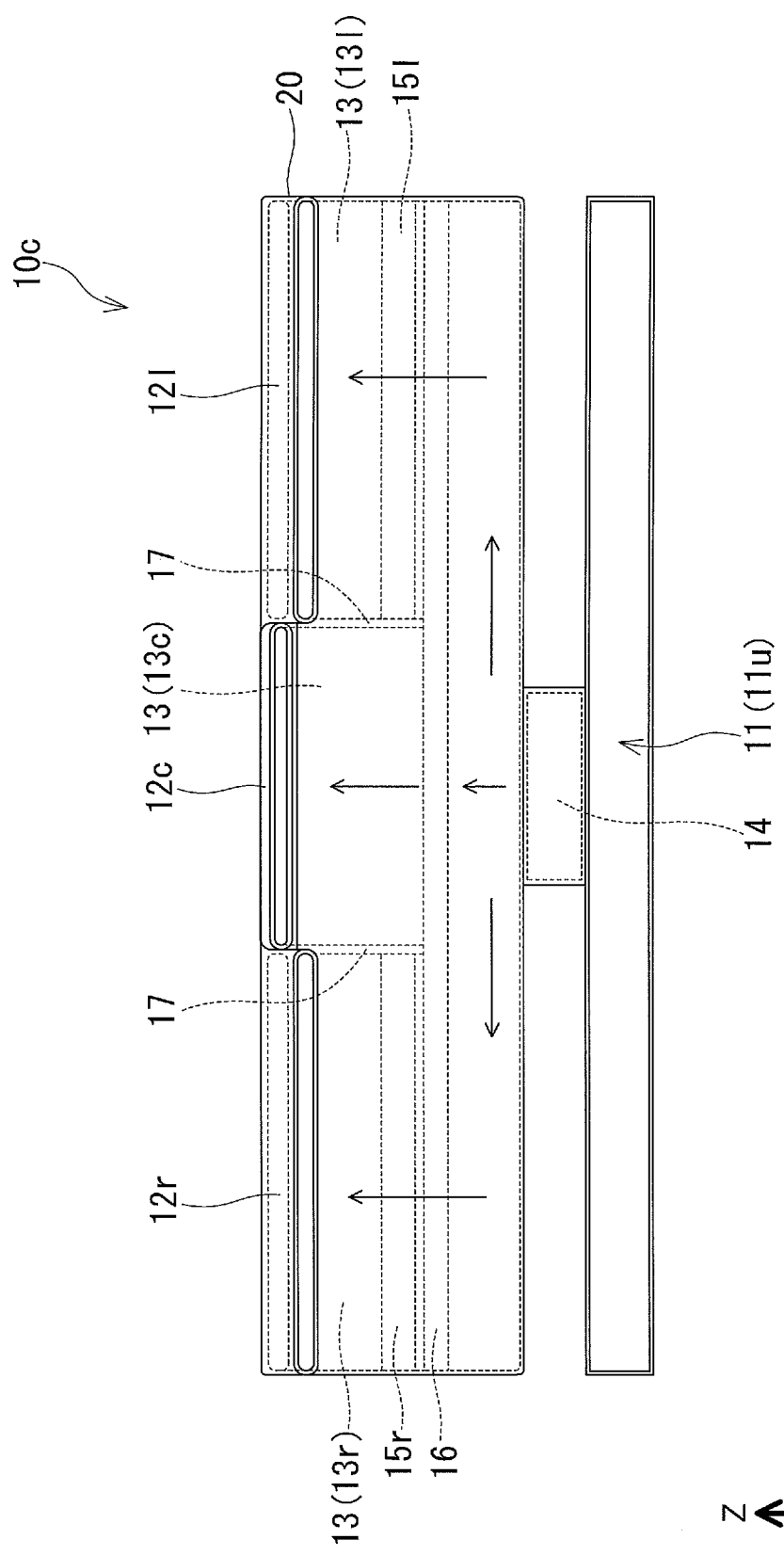
FIG. 7 is a front view of a vehicle heating apparatus according to a third embodiment of the present disclosure.

Next, a vehicle heating apparatus 10c according to a third embodiment will be described. In the vehicle heating apparatus 10c, as shown in FIG. 7, a single fan 14 is provided in the internal space 13 of the housing 20. The intake port 11 is formed as a unified intake port 11u for drawing air to be fed to the left nozzle 12l, to the right nozzle 12r, and to the air curtain nozzle 12c. The vehicle heating apparatus 10c further includes a flow-dividing member 16. The flow-dividing member 16 is provided downstream of the fan 14 in the direction of air flow in the internal space 13. The flow-dividing member 16 adjusts the amount of air flowing toward each of the left nozzle 12l, the right nozzle 12r, and the air curtain nozzle 12c. The flow-dividing member 16 is, for example, a plate-shaped member in which a plurality of air holes are formed. The opening areas, the number and the like of the air holes in a given region of the plate-shaped member are determined so that the velocities of flows of air blown out of the left nozzle 12l, the right nozzle 12r, and the air curtain nozzle 12c are not too high or too low.

The portion of the internal space 13 that is downstream of the flow-dividing member 16 is divided by the partition plate 17 into three sections. The first internal space is formed as the left flow path 13l from the flow-dividing member 16 to the left nozzle 12l. The second internal space is formed as the right flow path 13r from the flow-dividing member 16 to the right nozzle 12r. The third internal space is formed as the air curtain flow path 13c from the flow-dividing member 16 to the air curtain nozzle 12c. The left heater 15l is provided in the left flow path 13l. The right heater 15r is provided in the right flow path 13r. By actuation of the fan 14, air is drawn into the housing 20 through the unified intake port 11u. The flow of air drawn into the housing 20 through the unified intake port 11u and delivered by the fan 14 is divided by the flow-dividing member 16.

Air having passed through the flow-dividing member 16 and having flowed into the left flow path 13l is heated by the left heater 15l. Air having passed through the flow-dividing member 16 and having flowed into the right flow path 13r is heated by the right heater 15r. Thus, warm wind is blown out of the left nozzle 12l and the right nozzle 12r. Air having passed through the flow-dividing member 16 and having flowed into the air curtain flow path 13c is blown out of the air curtain nozzle 12c without being heated.

According to the present embodiment, the number of the fans 14 provided in the internal space 13 of the housing 20 is minimum; therefore, the production cost of the vehicle heating apparatus 10c can be reduced. In addition, flow of air delivered by the fan 14 can be divided by the flow-dividing member 16 so that the velocities of flows of air blown out of the left nozzle 12l, the right nozzle 12r, and the air curtain nozzle 12c are not too high or too low.

Fourth Embodiment

Figure 8:
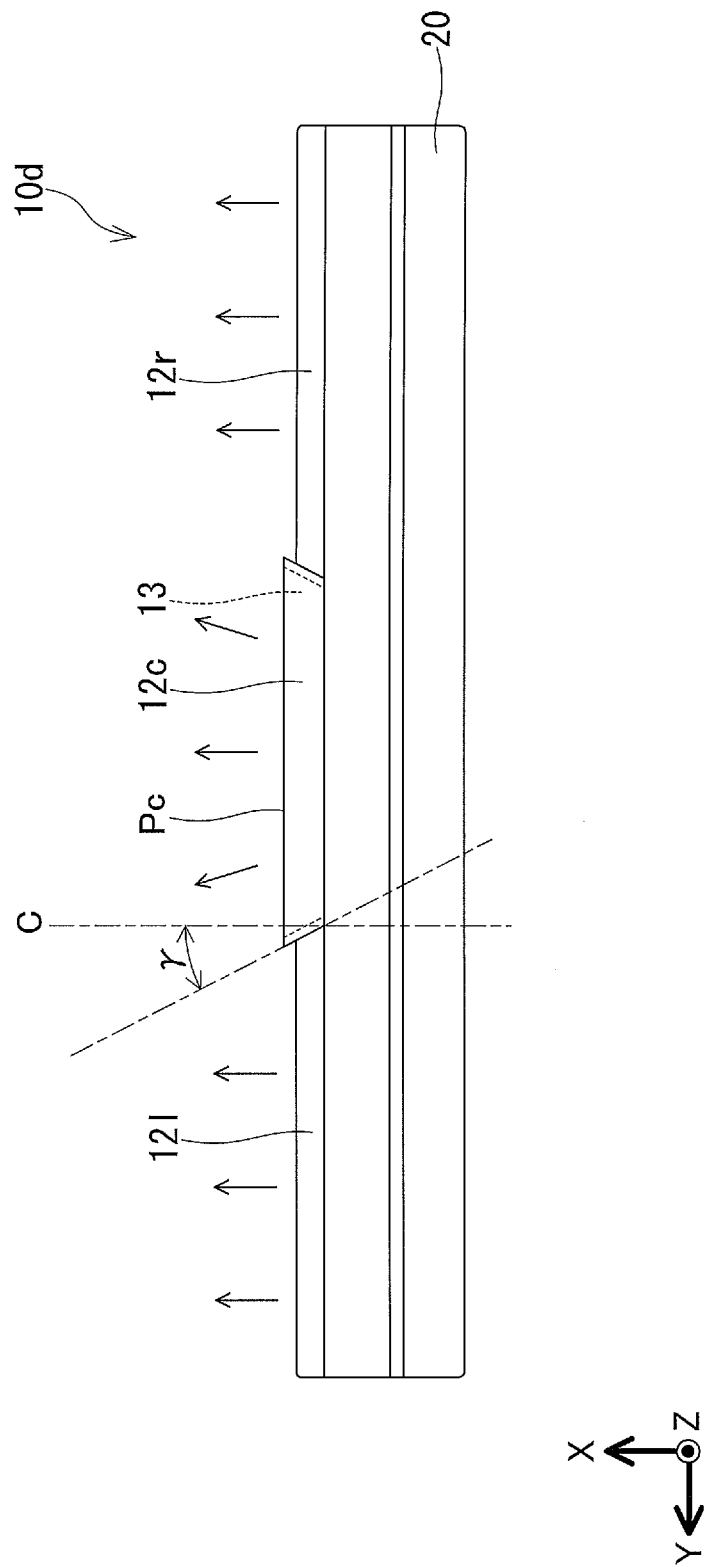
FIG. 8 is a plan view of a vehicle heating apparatus according to a fourth embodiment of the present disclosure.

Next, a vehicle heating apparatus 10d according to a fourth embodiment will be described. As shown in FIG. 8, the air curtain nozzle 12c is formed in such a manner that, in the vehicle heating apparatus 10d that is in the usage state, the internal space 13 in the air curtain nozzle 12c becomes wider in the width direction of the vehicle seat 2 (Y-axis direction) with decreasing distance to the opening Pc of the air curtain nozzle 12c. That is, when the vehicle heating apparatus 10d in the usage state is viewed in plan, the edges of the air curtain nozzle 12c in the Y-axis direction are inclined at an angle γ to a straight line C parallel to the X axis in the horizontal plane (XY plane). Thus, air is blown out of the air curtain nozzle 12c so as to spread in the width direction of the vehicle seat 2. Consequently, the upward movement of warm wind blown out of the left nozzle 12l and the right nozzle 12r can be restrained over a wide region.

The magnitude of the angle γ is not particularly limited as long as it is more than 0° and less than 90°. In order for air to be blown out of the air curtain nozzle 12c toward an appropriate region, the angle γ is desirably more than 0° and not more than 60°. The width of the internal space 13 in the air curtain nozzle 12c in the width direction of the vehicle seat 2 (Y-axis direction) may increase stepwise or continuously with decreasing distance to the opening Pc of the air curtain nozzle 12c.

Fifth Embodiment

Figure 9:
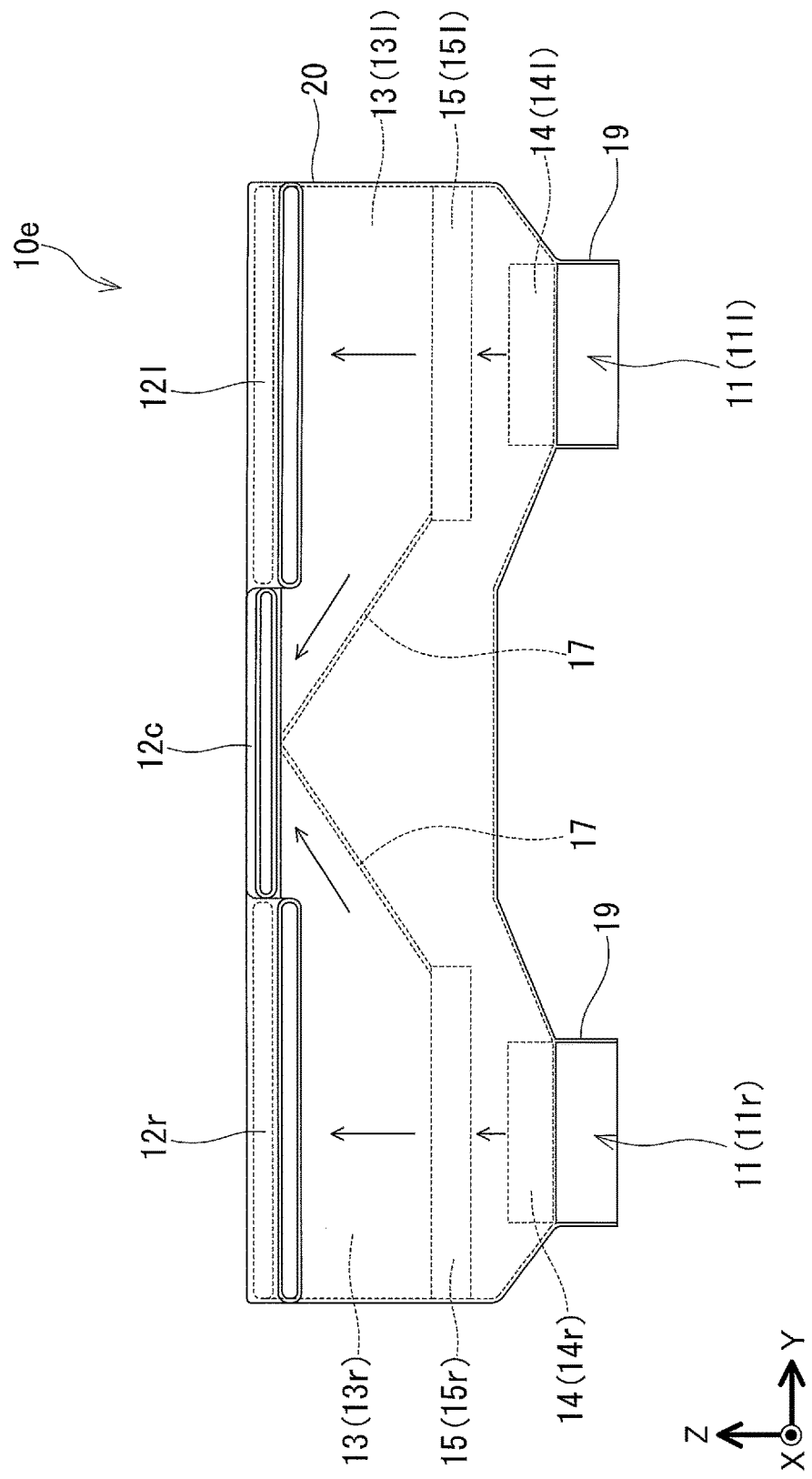
FIG. 9 is a front view of a vehicle heating apparatus according to a fifth embodiment of the present disclosure.

Next, a vehicle heating apparatus 10e according to a fifth embodiment will be described. In the vehicle heating apparatus 10e, as shown in FIG. 9, the internal space 13 of the housing 20 is partitioned by the partition plate 17. In the usage state, a portion of the partition plate 17 extends upward from the right end of the left heater 15l toward the center of the housing 20. Another portion of the partition plate 17 extends upward from the left end of the right heater 15r toward the center of the housing 20. The portion of the partition plate 17 that extends from the right end of the left heater 15l and the portion of the partition plate 17 that extends from the left end of the right heater 15r are connected at the center of the internal space 13. That is, the partition plate 17 connects the right end of the left heater 15l to the left end of the right heater 15r, and projects upward in a V shape in the housing 20 in the usage state. Thus, some of warm wind having passed through the left heater 15l is blown out of the air curtain nozzle 12c, and some of warm wind having passed through the right heater 15r is blown out of the air curtain nozzle 12c. Since warm wind having passed through the heater 15 is blown out of the air curtain nozzle 12c, the temperature of air blown out of the air curtain nozzle 12c is high. Therefore, the vicinity of the toes of the occupant can be warmed by warm wind blown out of the air curtain nozzle 12c.

Sixth Embodiment

Figure 10A:
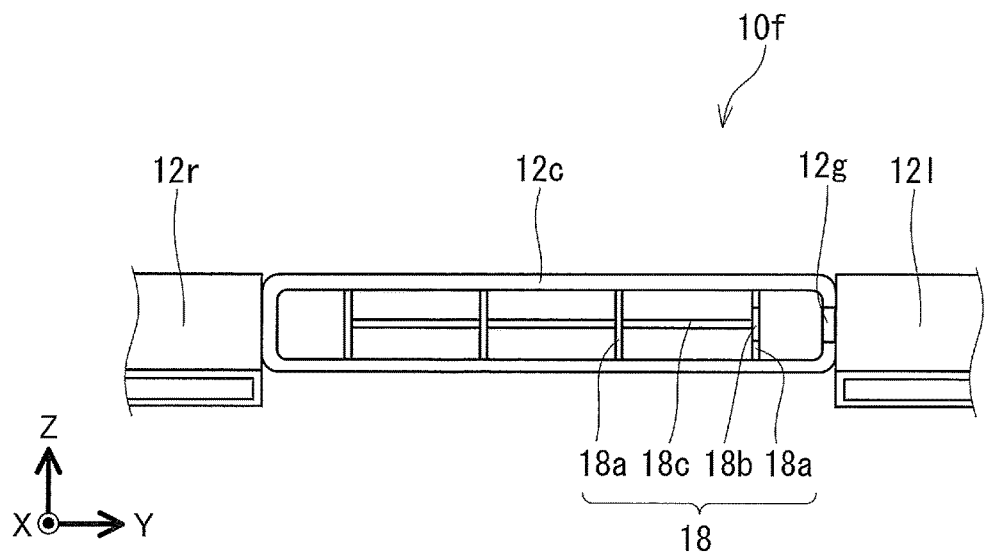
FIG. 10A is an enlarged view of a key portion of a vehicle heating apparatus according to a sixth embodiment of the present disclosure.

Next, a vehicle heating apparatus 10f according to a sixth embodiment will be described. As shown in FIG. 10A, the vehicle heating apparatus 10f includes an opening-closing mechanism 18 that opens and closes the opening of the air curtain nozzle 12c. The opening-closing mechanism 18 includes a panel 18a that is movable between a position for closing the opening of the air curtain nozzle 12c and a position for opening the opening. Specifically, the opening-closing mechanism 18 includes a plurality of panels 18a, a tab 18b, and a link 18c. The plurality of panels 18a are arranged in the width direction of the air curtain nozzle 12c (Y-axis direction), and are pivotally supported on the inner peripheral face of the air curtain nozzle 12c in the vicinity of the opening of the air curtain nozzle 12c. Each panel 18a is pivotally supported on the inner peripheral face of the air curtain nozzle 12c so as to be swingable in a direction in which the plurality of panels 18a are arranged. The link 18c couples the plurality of panels 18a together. Thus, upon swinging of any one of the panels 18a, the other panels 18a simultaneously swing. Each panel 18a assumes a position as defined by translating another panel 18a in the direction in which the panels 18a are arranged.

The tab 18b is provided in the panel 18a that is closest to the left nozzle 12l or the right nozzle 12r among the plurality of panels 18a. Thus, the occupant can adjust the positions of the plurality of panels 18a by moving the tab 18b. In addition, an engagement groove 12g for engagement with the tab 18b is formed at an end of the opening of the air curtain nozzle 12c.

Figure 10B:
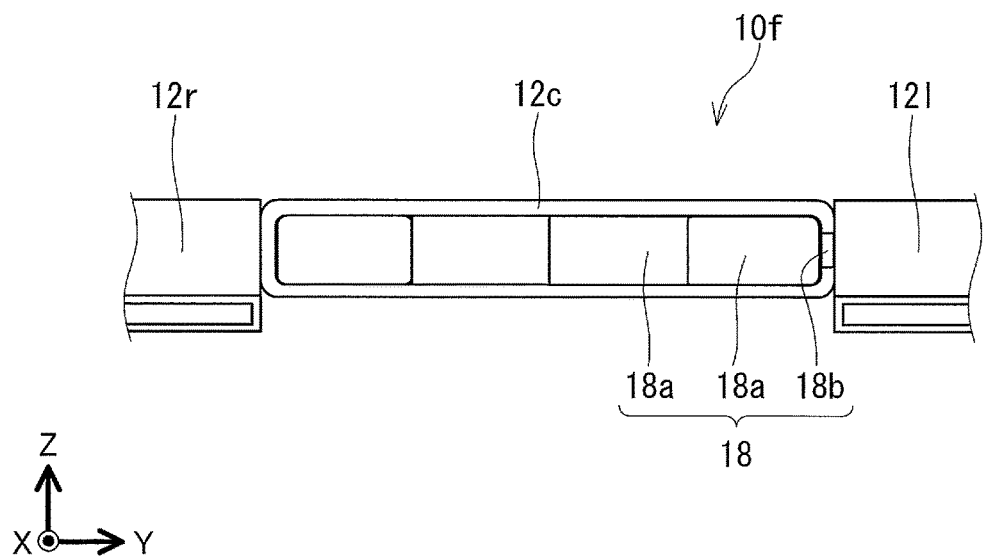
FIG. 10B is an enlarged view of the key portion of the vehicle heating apparatus in which an opening-closing mechanism of FIG. 10A is in a position for closing.
Figure 11A:
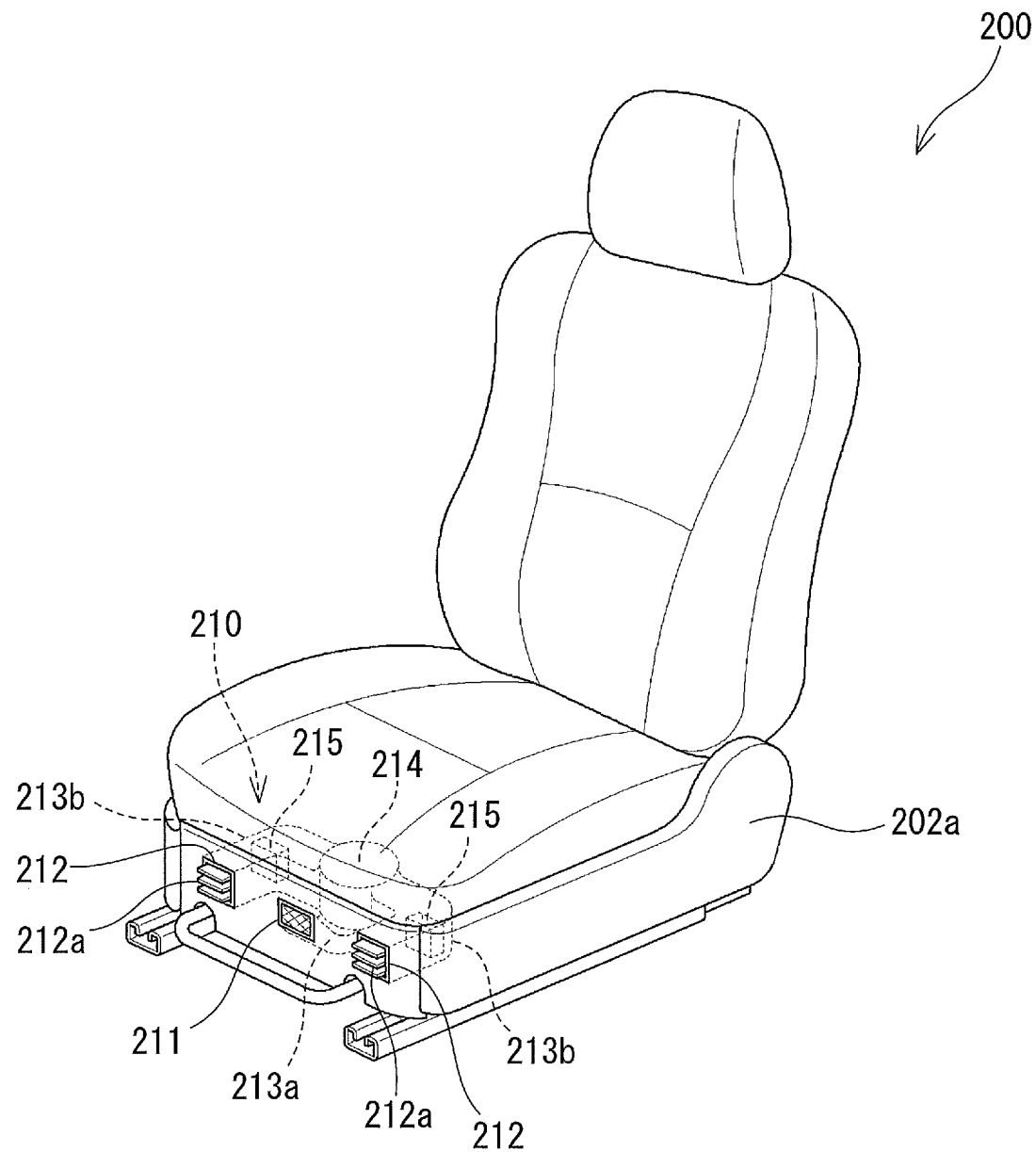
FIG. 11A is a perspective view of a conventional heater-equipped vehicle seat.
Figure 11B:
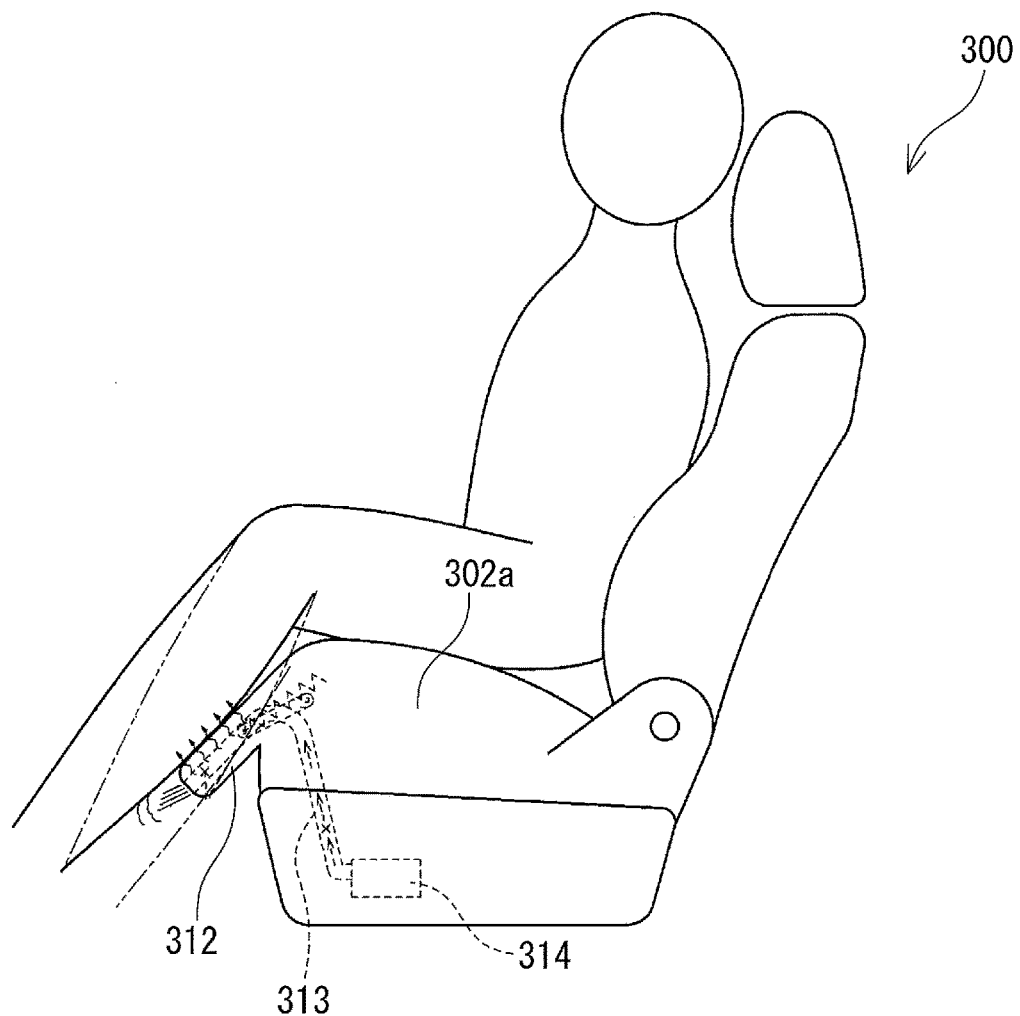
FIG. 11B is a side view of another conventional heater-equipped vehicle seat.

As shown in FIG. 10A, when the plurality of panels 18a assume the position perpendicular to the opening face of the air curtain nozzle 12c, the opening of the air curtain nozzle 12c is fully open. On the other hand, as shown in FIG. 10B, when the plurality of panels 18a assume the position parallel to the opening face of the air curtain nozzle 12c, the opening of the air curtain nozzle 12c is fully closed. Thus, depending on the situation, the occupant can close the opening of the air curtain nozzle 12c to prohibit air from being blown out of the air curtain nozzle 12c.

The tab 18b may be provided in the two outermost panels of the plurality of panels 18a. In this case, the operability of the panels 18a for opening and closing is improved. In addition, it is desirable that the direction of flow of air blown out of the air curtain nozzle 12c be not affected by the position of the panels 18a. For this purpose, for example, the link 18c may be subjected to a tensile force applied by a tension spring so that the position of the plurality of panels 18a is stabilized in the position perpendicular to the opening face of the air curtain nozzle 12c.

INDUSTRIAL APPLICABILITY

The vehicle heating apparatuses disclosed in the present description can be applied to seats of vehicles such as automobiles, trains, airplanes, and ships.

The invention claimed is:

1. A vehicle heating apparatus to be mounted on or built in a vehicle seat at a location below a sitting portion of the vehicle seat, the vehicle heating apparatus comprising:
   a housing having an intake port, a left nozzle, a right nozzle, an air curtain nozzle, and an internal space serving as air flow paths from the intake port to an opening of the left nozzle, to an opening of the right nozzle, and to an opening of the air curtain nozzle;
   a fan provided in the internal space; and
   a heater provided in the internal space, wherein
   in a usage state where the vehicle heating apparatus is mounted on the vehicle seat, the left nozzle and the right nozzle are formed so as to blow warm wind produced by the heater and the fan downward with respect to a horizontal direction at locations spaced apart from each other in a width direction of the vehicle seat, and
   in the usage state, the air curtain nozzle is located between the left nozzle and the right nozzle, and is formed so as to blow air delivered by the fan in a direction inclined upward at an angle of not more than 900 to a direction in which the warm wind is blown out of the left nozzle and the right nozzle.

2. The vehicle heating apparatus according to claim 1, wherein the air curtain nozzle is formed so as to blow air in a substantially horizontal direction or downward with respect to the horizontal direction in the usage state.

3. The vehicle heating apparatus according to claim 1, wherein an area of the opening of the air curtain nozzle is smaller than an area of the opening of the left nozzle and smaller than an area of the opening of the right nozzle.

4. The vehicle heating apparatus according to claim 1, wherein the air flow path from the intake port to the air curtain nozzle bypasses the heater.

5. The vehicle heating apparatus according to claim 1, wherein
the intake port comprises: a left intake port for drawing air to be fed to the left nozzle; a right intake port for drawing air to be fed to the right nozzle; and an air curtain intake port for drawing air to be fed to the air curtain nozzle, and
the air curtain intake port is formed so as to be located above the left intake port and the right intake port in the usage state.

6. The vehicle heating apparatus according to claim 1, wherein
the fan is a single fan provided in the internal space,
the intake port is formed as a unified intake port for drawing air to be fed to the left nozzle, to the right nozzle, and to the air curtain nozzle, and
the vehicle heating apparatus further comprises a flow-dividing member that is provided downstream of the fan in a direction of air flow in the internal space and that adjusts the amount of air flowing toward each of the left nozzle, the right nozzle, and the air curtain nozzle.

7. The vehicle heating apparatus according to claim 1, wherein the air curtain nozzle is formed in such a manner that the internal space in the air curtain nozzle becomes wider in the width direction of the vehicle seat with decreasing distance to the opening of the air curtain nozzle.

8. The vehicle heating apparatus according to claim 1, further comprising an opening-closing mechanism that opens and closes the opening of the air curtain nozzle.

9. A heater-equipped vehicle seat comprising:
a vehicle seat; and
the vehicle heating apparatus according to claim 1 that is mounted on or built in the vehicle seat at a location below a sitting portion of the vehicle seat.

* * * * *